Feb. 6, 1968     T. F. RISTAU     3,367,139

UNIVERSAL JOINT

Filed June 29, 1966

INVENTOR.
Theodore F. Ristau
BY
Herbert Furman
ATTORNEY

United States Patent Office 3,367,139
Patented Feb. 6, 1968

3,367,139
UNIVERSAL JOINT
Theodore F. Ristau, Saginaw, Mich., assignor to General Motors Corporation, Detroit, Mich., a corporation of Delaware
Filed June 29, 1966, Ser. No. 561,616
7 Claims. (Cl. 64—21)

This invention relates generally to universal joints and more specifically to ball-in-groove-type constant velocity universal joints in which application of torque to the joint produces relative axial movement of the members.

Previously, axially movable universal joints have been developed for swing-axle type vehicles to lengthen or shorten the axle upon application of torque to prevent "squat." One such joint included like-handed helical grooves in one member and straight grooves in the other member which produced sufficient elongation of the drive axle upon the application of torque to overcome "squat." One disadvantage of this type of joint was its tendency to operate as a screw, with relative axial movement of the members accompanied by relative rotational movement. Also this joint did not provide for true rolling of the balls upon relative axial displacement of the members since the ball cage was connected to one of the members.

A further development in the art produced a joint of the alternate crossed groove type wherein one set of grooves in each member had a one-hand helix and a second set of grooves had a lesser angled opposite-hand helix. Since the groove angles were different, the net summation of forces exerted on the balls by the grooves upon torque application produced a resultant axial force and relative axial displacement of the joint members. However such a joint suffered a fault common to all crossed groove joints in that large joint members were required to provide sufficient spacing of adjacent oppositely angled grooves in each member to assure adequate joint strength.

This invention provides a constant velocity universal joint which overcomes the prior art problems of relative rotation and joint size. Such a joint is useful in swing axles or in a conventional drive line in which contraction of the drive shaft is desirable to overcome rear axle "flutter."

One feature of this invention is that it provides a constant velocity universal joint in which application of torque to the joint will produce rolling relative axial movement of the members without relative rotational displacement. Another feature is that the joint members are provided with sets of corresponding crossed grooves having like-handed helices to produce axial movement and alternated sets of corresponding straight grooves to preclude relative rotation of the members. Yet another feature is that the angles of convergence of adjacent grooves is very small, thus permitting a substantial reduction in size of the joint. Still another feature is that the groove configuration permits greater relative axial displacement of the members than in previous joints of the same size. A further feature is that stop means are provided at both ends of the joint to limit the relative axial displacement of the members.

Further features of this invention will become readily apparent upon reference to the following detailed description of the attached drawings in which.

Figure 1:
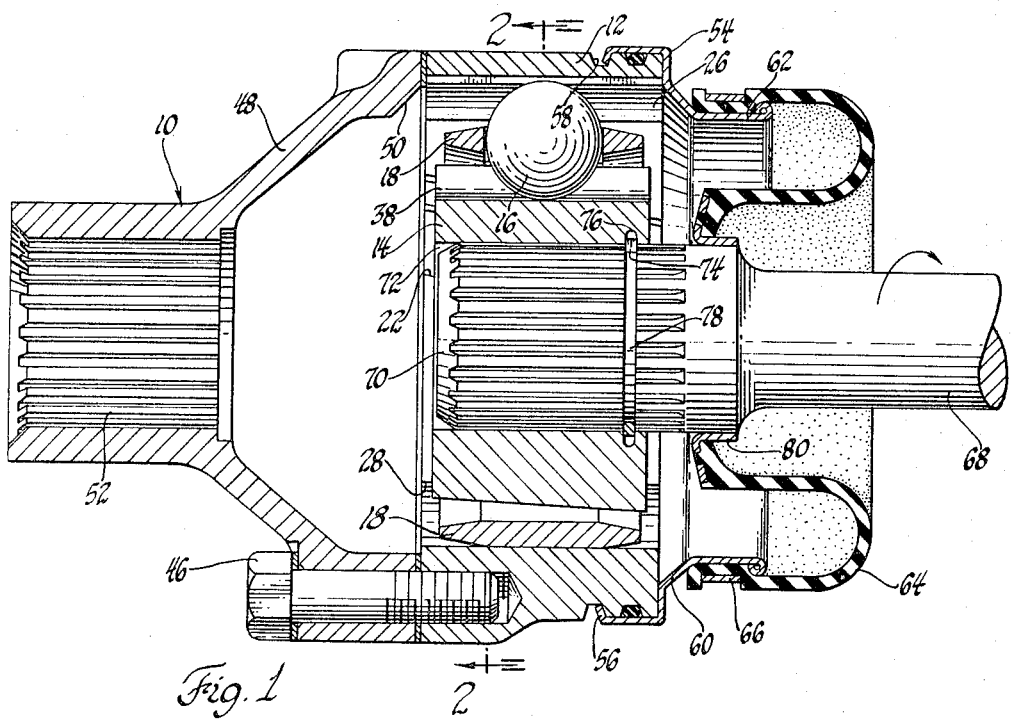
FIGURE 1 is a sectional view of a universal joint according to this invention.
Figure 3:
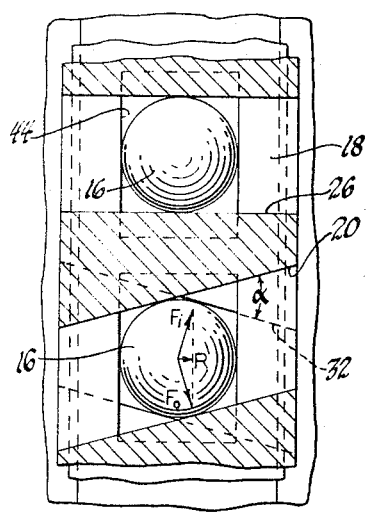
FIGURE 3 is a partial sectional view taken generally on the plane indicated by line 3—3 of FIGURE 2.
Figure 2:
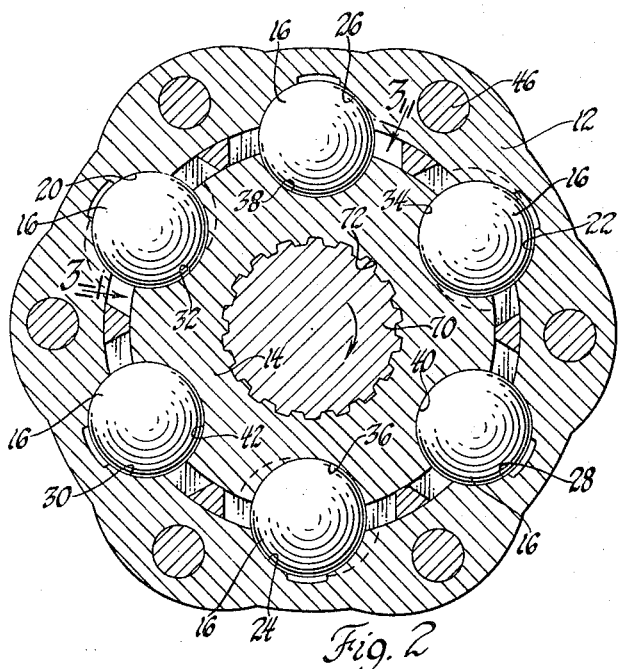
FIGURE 2 is a sectional view taken generally on the plane indicated by line 2—2 of FIGURE 1.

Referring now to FIGURE 1 of the drawings, a universal joint 10 according to this invention generally includes an outer member 12, an inner member 14, a plurality of balls 16 interconnecting the inner and outer members and a cage 18 for retaining the balls. As shown in FIGURE 2, outer member 12 includes a first set of three grooves 20, 22 and 24 and a second set of three grooves 26, 28 and 30 alternated therewith. As shown in FIGURE 3, the first set grooves 20, 22 and 24 are angled with respect to the axis of the inner member and have a left-hand lead as shown in FIGURE 2. These grooves may be axially straight, but are preferably helical, i.e. having a constant radial distance from the outer member axis. The second set grooves 26, 28 and 30 are parallel to the outer member axis.

Referring again to FIGURE 2, inner member 14 includes a third set of three grooves 32, 34 and 36 and a fourth set of three grooves 38, 40 and 42 alternated therewith. As shown in FIGURE 3, the third set grooves 32, 34 and 36 are crossed with respect to the inner member axis and have a right-hand lead, as viewed in FIGURE 2. These grooves also may be straight but are preferably helical. As shown in FIGURE 3, the third set grooves 32, 34 and 36 are crossed with respect to the corresponding first set grooves 20, 22 and 24, each being equally but oppositely angled with respect to the axes of members 12 and 14. The fourth set grooves 38, 40 and 42 are parallel to the inner member axis and are therefore parallel to the corresponding outer member grooves 26, 28 and 30. Thus the universal joint 10 is provided with corresponding pairs of crossed grooves which are alternated with corresponding pairs of parallel grooves.

Each pair of grooves such as 20, 32 and 26, 38 receives one of the balls 16 through which torque is transmitted from member 14 to member 12. As shown in FIGURE 3, cage 18 includes a plurality of circumferentially aligned ball apertures 44 which maintain balls 16 in a single torque transferring plane. Apertures 44 are circumferentially large enough to accommodate lateral movement of the balls contained in the crossed groove pairs during angulation and axial movement of members 12 and 14.

As shown in FIGURE 1, cage 18 is capable of relative axial movement between the opposed cylindrical surfaces of members 12 and 14. Thus axial movement of member 12 relative to member 14 is accompanied by a rolling action of balls 16 which locate cage 18 axially half the distance of relative movement. As is well known in the art, upon angulation of members 12 and 14, the crossed groove pairs position the balls in the plane bisecting the angle between members 12 and 14, i.e. the homokinetic plane, to produce constant velocity operation.

Upon application of torque to member 14 in a clockwise direction, as viewed in FIGURE 2, no resultant axial thrust will be transmitted to the balls 16 which are confined in the parallel corresponding groove pairs such as 26, 38. However such torque will cause crossed grooves 32, 34 and 36 to transmit a force $F_i$ to balls 16, as shown in FIGURE 3. A reactive force $F_o$ will be transmitted to the balls 16 by the outer grooves 22. These forces produce a resultant force R. If member 14 is axially fixed, it is readily apparent that the application of such torque to the joint will cause balls 16 and outer member 12 to move in the direction of the resultant R, i.e. toward inner member 14. Relative rotational displacement of members 12 and 14 is precluded by the provision of the parallel groove pairs, such as 26, 38. Thus the clockwise application of torque to member 14 will cause an inward telescoping of the members which roll on balls 16.

The angle formed by the crossed grooves is selected upon consideration of the requisite torque at which frictional and inertial forces are overcome to produce relative axial movement. As shown in FIGURE 3, the angle of convergence of any pair of adjacent grooves, such as 20 and 26, is very small. This may be contrasted with prior joints of the unequally-angled, alternate crossed groove type in which the angle of one set of grooves must be larger than the angle of the other set to produce a net resultant force. Such an arrangement requires large groove angles and consequent larger joint members to accommodate the oppositely angled grooves.

The joint of this invention overcomes this disadvantage. Since the alternate pairs of parallel grooves produce no axial thrust upon application of torque to the joint, the angles of the crossed grooves relative to their respective member axes may be made very small to produce axial displacement at any given torque. Also the parallel grooves permit a closer spacing of all grooves. This results in a much smaller joint than previously possible. A further advantage is that, since the angle of the crossing of the corresponding groove pairs such as 20 and 32 is much smaller than in the unequally-angled alternate crossed groove joints, the joint may be made longer to permit greater relative axial movement of the members without weakening the joint.

As shown in FIGURE 1, member 12 is bolted at 46 to a coupling 48. Coupling 48 includes an inclined surface 50 adjacent each of the outer member grooves to provide a stop which limits the movement of balls 16, cage 18 and member 14 inwardly of member 12. Coupling 48 further includes an internally splined boss 52 which is adapted to be connected to a driven shaft, such as a rear axle pinion input shaft. A retainer 54 is crimped at 56 into an annular groove 58 in outer member 12. Retainer 54 includes an angled intermediate portion 60 which serves as a stop that limits movement of member 14, balls 16 and cage 18 outwardly of member 12. Thus coupling surface 50 and retainer portion 60 positively limit the relative axial movement of members 12 and 14.

Retainer 54 terminates in a collar 62 which clamps one end of a conventional boot seal 64 at 66. A drive shaft 68, such as a vehicle propeller shaft, has an enlarged splined end 70 which is received within an internally splined bore 72 of member 14. Member 14 is axially locked to shaft end 70 by a conventional split locking ring 74 which is received within a groove 76 in member 14 and within a groove 78 of shaft end 70. A retainer 80 secures the other end of seal 64 to shaft end 70.

Thus this invention provides a constant velocity universal joint having corresponding pairs of crossed grooves alternated with corresponding pairs of parallel grooves which permit rolling relative axial movement of the members without relative rotation and permit a significant decrease in the size of the joint. While only a preferred embodiment of this invention is shown and described, other modifications are possible without departing from the scope of this invention.

I claim:

1. An axially slidable universal joint comprising an outer member having a first set of grooves each crossed with respect to the outer member axis and a second set of grooves each parallel to the outer member axis, an inner member having a third set of grooves each crossed with respect to the inner member axis and crossed with respect to a corresponding first set groove, the inner member having a fourth set of grooves each parallel to the inner member axis and corresponding to a second set groove, and a plurality of torque transferring elements received within the corresponding grooves and interconnecting the inner and outer members, whereby upon application of torque to one of the members the corresponding first and third set grooves force the torque transferring elements axially of both members to effect relative axial movement of the members.

2. The universal joint recited in claim 1, including positioning means to position the torque transferring elements in a single torque transferring plane, the positioning means being axially movable relative to both members.

3. The universal joint recited in claim 2, wherein the angle at which each first set groove crosses the outer member axis is equal to the angle at which each third set groove crosses the inner member axis.

4. The universal joint recited in claim 2, wherein each of the first and third set grooves is helical.

5. The universal joint recited in claim 2, including stop means to limit the relative axial movement of the members.

6. The universal joint recited in claim 2, wherein the torque transferring elements are balls and the positioning means is a cage having a plurality of circumferentially aligned ball apertures.

7. The universal joint recited in claim 2, wherein each of the first and third set grooves is helical, the angle at which each first set groove crosses the outer member axis is equal to the angle at which each third set groove crosses the inner member axis, the torque transferring elements are balls, and the positioning means is a cage having a plurality of circumferentially aligned ball apertures, the cage and the grooves cooperating to position the balls in the homokinetic plane upon angulation of the members to produce constant velocity operation, the universal joint further including first stop means to limit the relative movement of the members in one axial direction and second stop means to limit the relative movement of the members in the other axial direction.

References Cited

UNITED STATES PATENTS

| 2,313,279 | 3/1943 | Suczek | 64—21 |
| 2,618,942 | 11/1952 | Dodge | 64—8 |
| 3,105,369 | 10/1963 | Mazziotti et al. | 64—21 |
| 3,133,431 | 5/1964 | Zech | 64—21 |
| 3,176,477 | 4/1965 | Mazziotti | 64—21 |

HALL C. COE, *Primary Examiner.*